April 4, 1950 B. M. SURRATT 2,503,079
SHIELD FOR AGRICULTURAL IMPLEMENTS
Filed Aug. 22, 1947 2 Sheets-Sheet 1
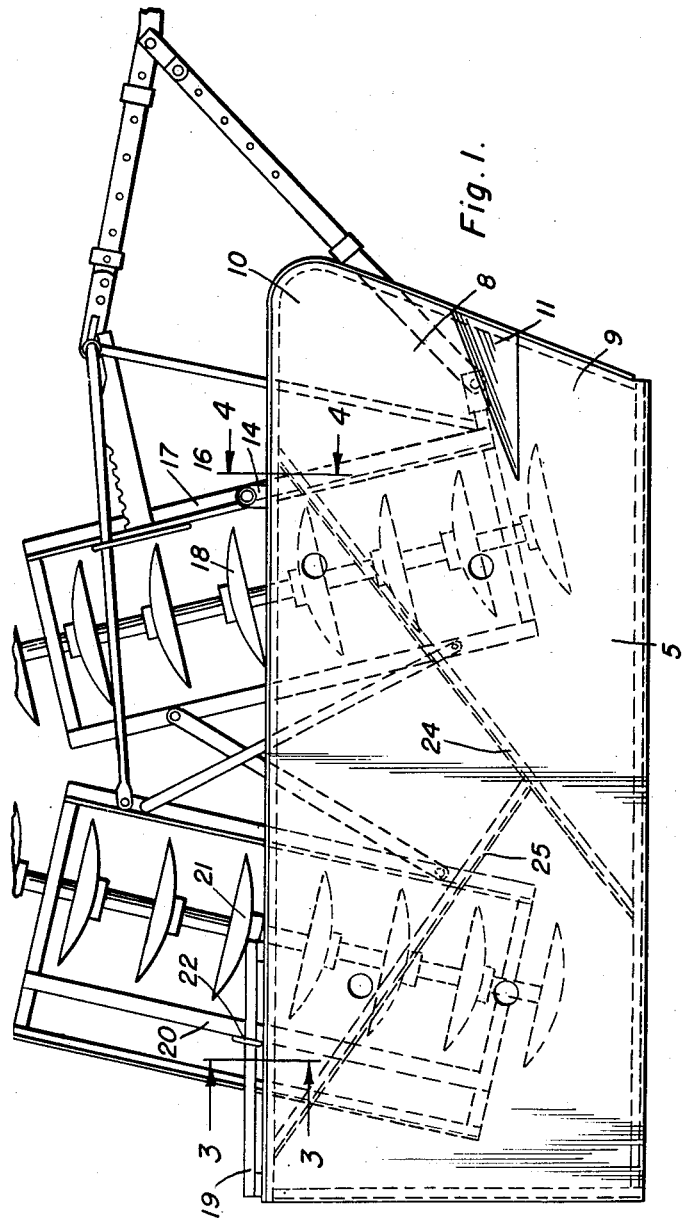
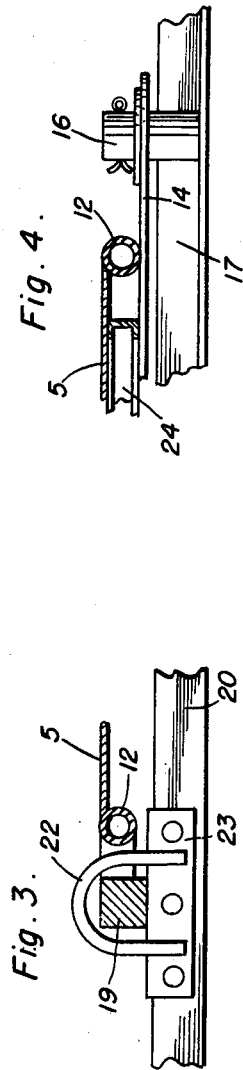
Inventor
Billie M. Surratt April 4, 1950  B. M. SURRATT  2,503,079
SHIELD FOR AGRICULTURAL IMPLEMENTS
Filed Aug 22, 1947  2 Sheets-Sheet 2
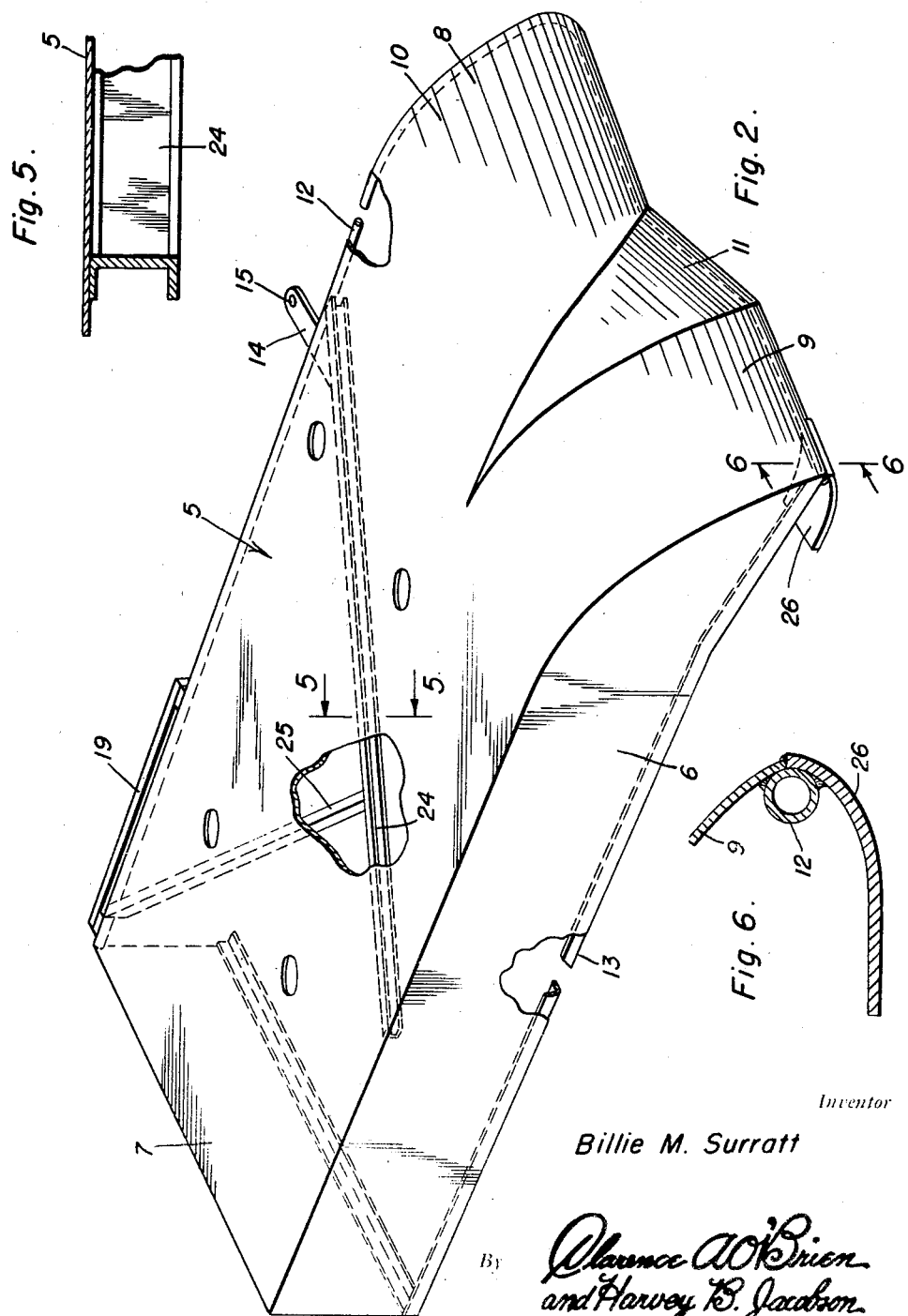
Inventor
Billie M. Surratt Patented Apr. 4, 1950

2,503,079

UNITED STATES PATENT OFFICE 2,503,079

SHIELD FOR AGRICULTURAL IMPLEMENTS

Billie M. Surratt, Dade City, Fla., assignor of one-third to Samuel W. Surratt and one-third to Frank M. Massey, both of Dade City, Fla.

Application August 22, 1947, Serial No. 770,027

1 Claim. (Cl. 97—192)

The present invention relates to new and useful improvements in shields or fenders for agricultural implements, such as discs and other harrows whereby to enable the implement to work closely under fruit trees, shrubbery or the like to pick up the foliage and branches and to prevent contact thereof with the discs of the harrows and thus prevent cutting or bruising of the fruit or injury to the branches.

An important object of the invention is to provide a shield of this character for use with adjustably inclined disc frames without interference with the free adjustment thereof.

A still further object of the invention is to provide a shield of this character including a transversely stepped nose portion whereby the outer edge of the shield at its front end is constructed substantially lower to facilitate its movement under the branches of a tree.

A still further object is to provide a device of this character of simple and practical construction, which is strong and durable, efficient and reliable in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view;

Figure 2 is an enlarged perspective view with parts broken away and shown in section;

Figures 3 and 4 are fragmentary transverse sectional views taken respectively on the lines 3—3 and 4—4 of Figure 1;

Figure 5 is a fragmentary sectional view taken on the line 5—5 of Figure 2; and, Figure 6 is an enlarged fragmentary sectional view taken on the line 6—6 of Figure 2.

Referring now to the drawings in detail wherein for the purpose of illustration I have disclosed a preferred embodiment of the invention the numeral 5 designates the shield generally which is constructed of substantially light gauge metal and of generally rectangular form and including an outer side wall 6, a rear wall 7 and a nose 8 at the front end thereof. The nose 8 is curved downwardly and is inclined in a rearward direction toward the outer edge 6 of the shield.

The nose portion 8 is shaped to provide a substantially low outer portion 9 and a relatively higher or raised inner portion 10 connected to the lower portion 9 by an inclined web 11.

The inner side edge of the shield 5 is provided with a reinforcing metal tubing 12 which extends across the lower edge of the lower and upper nose portions 10 as well as across the front edge of the web portion 11.

The lower edges of the side wall 6 and rear wall 7 are reinforced by an angle iron member 13.

A bracket 14 is secured to the inner edge of the shield adjacent its front portion and projects inwardly therefrom and is formed at its free end with an opening 15 for pivotally mounting on an upstanding pin 16 rising from the intermediate portion of the front frame member 17 of a front disc harrow 18, the shield 5 covering one end of the harrow and with the side wall 6 thereof projecting substantially outwardly from the side of the harrow as shown in Figure 1 of the drawings.

A longitudinally extending bar 19 is also suitably secured to the inner edge of the shield 5 adjacent its rear portions and in a position with the bar 19 spaced outwardly in parallelism from the inner side edge of the shield.

The rear frame member 20 of the rear disc harrow 21 is provided with an upstanding loop 22 secured to the frame by means of an attaching plate 23, the loop riding on the bar 19 during the angular adjustment of the front and rear harrow frames in the usual manner.

Front and rear channel iron bars 24 and 25 are suitably secured to the underside of the shield 5 and rest respectively on the front and rear harrow frames 17 and 20 in an inclined position with respect thereto whereby to facilitate the sliding of the shield on the harrow frame during adjustment of the harrow.

An arcuate skid or shoe 26 is suitably secured to the reinforcing tubing 12 at the outer edge of the nose 8 to support the outer edge of the shield on the ground and to facilitate traveling of the shield over the ground during operation of the harrow.

In the operation of the device the shield is placed in position on one end of the front and rear frames 17 and 20 of a disc harrow, as shown in Figure 1, and with the arm 14 pivoted on the pin 16 of the front frame and the bar 19 slidable in the loop 22 of the rear frame to maintain the shield in a longitudinal position during the adjustment of the frames relative to each other.

The nose 8 of the shield will ride under low hanging limbs of trees to lift the limbs and thus permit working of the harrow closely to the trees.

The stepped formation of the nose will move the limbs away from the discs of the harrow during the lifting action.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

The combination with an agricultural implement having a draft element and front and rear implement frames adjustable in an inclined position relative to each other, of a shield supported directly on and covering corresponding ends of said frames, and means connecting the shield to each frame for swinging therewith while resting thereon to maintain the shield in a uniformly covering position during adjustment of the frame, said means comprising a pivotal connection between the front frame and the shield, a longitudinal bar carried by the shield adjacent its rear end, and a loop carried by the rear frame and slidably engaged with the bar.

BILLIE M. SURRATT.

REFERENCES CITED

The following references are of record in the file of this patent:

UNITED STATES PATENTS

| Number | Name | Date |
|---|---|---|
| 1,318,419 | Vathing et al. | Oct. 14, 1919 |
| 1,945,514 | Bowman et al. | Feb. 6, 1934 |